(12) United States Patent
Zhou (10) Patent No.: US 10,802,613 B2
(45) Date of Patent: Oct. 13, 2020

(54) CROSS APPLICATION DIGITAL INK REPOSITORY

(71) Applicant: Microsoft Technology Licensing, LLC, Redmond, WA (US)

(72) Inventor: Francis Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/263,386

(22) Filed: Jan. 31, 2019

(65) Prior Publication Data

US 2019/0163293 A1  May 30, 2019

Related U.S. Application Data

(63) Continuation of application No. 15/004,574, filed on Jan. 22, 2016, now Pat. No. 10,228,775.

(51) Int. Cl.

| | | |
|---|---|---|
| *G06F 3/048* | (2013.01) | |
| *G06F 3/0354* | (2013.01) | |
| *G06K 9/00* | (2006.01) | |
| *G06F 40/171* | (2020.01) | |
| *G06F 3/0482* | (2013.01) | |
| *G06F 3/0488* | (2013.01) | |
| *G06F 8/61* | (2018.01) | |
| *H04L 29/08* | (2006.01) | |

(52) U.S. Cl.
CPC ........ *G06F 3/03545* (2013.01); *G06F 3/0482* (2013.01); *G06F 3/04883* (2013.01); *G06F 8/61* (2013.01); *G06F 40/171* (2020.01); *G06K 9/00402* (2013.01); *H04L 67/34* (2013.01); *G06K 2209/27* (2013.01)

(58) Field of Classification Search
CPC .......................................... G06F 3/0481–0489
See application file for complete search history.

(56) References Cited

U.S. PATENT DOCUMENTS

| | | | | |
|---|---|---|---|---|
| 6,208,755 | B1 * | 3/2001 | Mori | G06K 9/68 |
| | | | | 382/187 |
| 6,565,611 | B1 * | 5/2003 | Wilcox | G06F 17/242 |
| | | | | 715/203 |
| 6,668,081 | B1 * | 12/2003 | Ilan | G06F 3/04883 |
| | | | | 178/18.03 |
| 7,353,453 | B1 * | 4/2008 | Simmons | G06F 17/241 |
| | | | | 345/173 |
| 7,707,212 | B2 * | 4/2010 | Dettinger | G06F 16/24573 |
| | | | | 707/736 |
| 9,087,059 | B2 * | 7/2015 | Petrou | G06F 16/434 |

(Continued)

*Primary Examiner* — Steven B Theriault
(74) *Attorney, Agent, or Firm* — Fiala & Weaver P.L.L.C.

(57) ABSTRACT

A computing device includes a digital ink system that provides digital ink support to applications on the computing device. Digital ink inputs are received by the digital ink system, which provides ink stroke data for the digital ink inputs to the application for storage in a manner and format the application desires. The digital ink system also generates a digital ink container associated with the digital ink input, and communicates the digital ink container to a digital ink repository. The digital ink repository stores digital ink containers for multiple applications, and can be searched from a computing device to identify digital ink input to an application regardless of which application the digital ink was input to.

20 Claims, 6 Drawing Sheets

(56) References Cited

U.S. PATENT DOCUMENTS

| | | | | |
|---|---|---|---|---|
| 2002/0165873 | A1* | 11/2002 | Kwok | G06K 9/00872 |
| | | | | 715/268 |
| 2004/0201602 | A1* | 10/2004 | Mody | G05B 19/409 |
| | | | | 715/700 |
| 2004/0205545 | A1* | 10/2004 | Bargeron | G06F 17/241 |
| | | | | 715/205 |
| 2005/0256825 | A1* | 11/2005 | Dettinger | G06F 16/252 |
| 2006/0031755 | A1* | 2/2006 | Kashi | G06F 17/242 |
| | | | | 715/201 |
| 2006/0277159 | A1* | 12/2006 | Napper | G06F 17/242 |
| 2007/0022329 | A1* | 1/2007 | Adamek | G06F 16/5854 |
| | | | | 714/701 |
| 2008/0122871 | A1* | 5/2008 | Guday | G06F 21/6218 |
| | | | | 345/634 |
| 2009/0138830 | A1* | 5/2009 | Borgaonkar | G06F 3/04883 |
| | | | | 715/863 |
| 2014/0245120 | A1* | 8/2014 | Schwartz | G06K 9/00402 |
| | | | | 715/226 |
| 2014/0337804 | A1* | 11/2014 | Hwang | G06F 3/017 |
| | | | | 715/863 |
| 2015/0371417 | A1* | 12/2015 | Angelov | G06Q 10/101 |
| | | | | 345/442 |

\* cited by examiner

CROSS APPLICATION DIGITAL INK REPOSITORY

CROSS-REFERENCE TO RELATED APPLICATIONS

This application is a continuation of U.S. patent application Ser. No. 15/004,574, filed Jan. 22, 2016, now U.S. Pat. No. 10,228,775, the entirety of which is incorporated by reference herein.

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to a touch-sensing functionality such as a touchscreen, which is interpreted as digital ink. The freehand input may be converted to a corresponding visual representation on a display, such as for taking notes, for creating and editing an electronic document, and so forth.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a digital ink input to an application is received and ink stroke data for the digital ink input is provided to the application. An indication of the ink stroke data for the digital ink input as well as data representing a context of the digital ink input is added to a digital ink container, the data representing the context of the digital ink input including an identifier of the application. The digital ink container is communicated to a cross application digital ink repository. The cross application digital ink repository stores the digital ink container as well as multiple additional digital ink containers each including ink stroke data indications for additional digital ink inputs to each of one or more additional applications.

In accordance with one or more aspects, a computing device includes one or more processors and a computer-readable storage medium having stored thereon multiple instructions that, responsive to execution by the one or more processors, cause the one or more processors to perform multiple acts. These acts include receiving a digital ink input to an application executed by the one or more processors and providing to the application ink stroke data for the digital ink input. These acts further include adding, to a digital ink container, an indication of the ink stroke data for the digital ink input, adding, to the digital ink container, context data representing a context of the digital ink input, the context data including a uniform resource identifier of the application that distinguishes the application from other applications, and communicating the digital ink container to a cross application digital ink repository, the cross application digital ink repository storing the digital ink container as well as multiple additional digital ink containers each including ink stroke data indications for additional digital ink inputs to each of the other applications.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

A cross application digital ink repository is discussed herein. A computing device includes a digital ink system that provides digital ink support to applications on the computing device. Generally, digital ink refers to freehand input to a touch-sensing device such as a touchscreen, which is interpreted by the computing device as digital ink (or simply "ink"). Digital ink may be provided in various ways, such as using a pen (e.g., an active pen, a passive pen, and so forth), a stylus, a finger, and so forth. The digital ink system provides functionality allowing applications to receive digital ink inputs from a user of the computing device, store received digital ink inputs, and display digital ink inputs. Multiple applications can use the functionality provided by the digital ink system, alleviating the applications from the burden of implementing their own digital ink functionality.

Digital ink input from a user to an application is received by the digital ink system on behalf of the application. The digital ink input is analyzed by the digital ink system, and ink stroke data is generated and provided to the application for storage. This ink stroke data refers to various information describing the digital ink input, such as the coordinates on the input device where the digital ink input occurred and pressure information indicating an amount of pressure applied at each of those coordinates for the digital ink input. The application can then store the ink stroke data in whatever format or location the application desires, can allow subsequent retrieval of the stored ink stroke data via the application (e.g., in response to a user request), and can provide the retrieved stored ink stroke data to the digital ink system (which uses the retrieved ink stroke data to display the digital ink).

The digital ink system also generates a digital ink container associated with the digital ink input. The digital ink container refers to a storage container for data (e.g., a file, a record in a database, etc.). An indication of the ink stroke data for the digital ink input is added to the digital ink container along with data representing a context of the digital ink input. The indication of the ink stroke data can be the ink stroke data itself or other data identifying the digital ink input (e.g., a screen shot or screen capture depicting the digital ink input). The context of the digital ink input can include various information describing when the digital ink input was received and/or an environment in which the digital ink input was received, such as a time and/or date of when the digital ink input was received, the application via which the digital ink input was received, a geographic location of the device receiving the digital ink input at the time the digital ink input was received, and so forth.

The digital ink container is communicated to a digital ink repository, which stores the digital ink containers for multiple different digital ink inputs to multiple different applications. The digital ink repository can be stored in various locations, such as a remote service (e.g., accessed via the Internet and/or other network), on a pen used to provide the digital ink input, and so forth.

The digital ink repository can be searched by various different applications, including applications that receive digital ink input and applications that do not receive digital ink input. Various search criteria are provided by a user searching the digital ink repository, and these criteria are compared to the data stored in the digital ink container (e.g., the context data). This allows, for example, a user to search for digital ink that was input to a particular application, digital ink that was input at a particular time and/or date, digital ink that was input when the computing device receiving the digital ink was at a particular geographic location, and so forth.

Different digital ink containers that satisfy the search criteria are identified to the user, such as by displaying the digital ink input associated with the digital ink container (using the indication of the ink stroke data in the digital ink container). The user can select one of the digital ink containers that satisfy the search criteria, and in response the application that received the digital ink input is run and optionally displays (using the digital ink system) the digital ink input.

Thus, the techniques discussed herein provide a cross application digital ink repository that stores digital ink containers associated with digital ink input to multiple applications, allowing a user to search for digital ink regardless of which application the digital ink was input to. This provides a simplified user interface for searching for digital ink, alleviating the need for the user to open each different application he or she uses to search for digital ink. This also allows a user to search for digital ink from one device that does not currently have the application to which the digital ink was input on another device. This simplified user interface for searching for digital ink can reduce the time spent by the user searching for digital ink, thus reducing the amount of time his or her computing device is used to search for digital ink and thus reducing the energy usage of his or her computing device.

Figure 1:
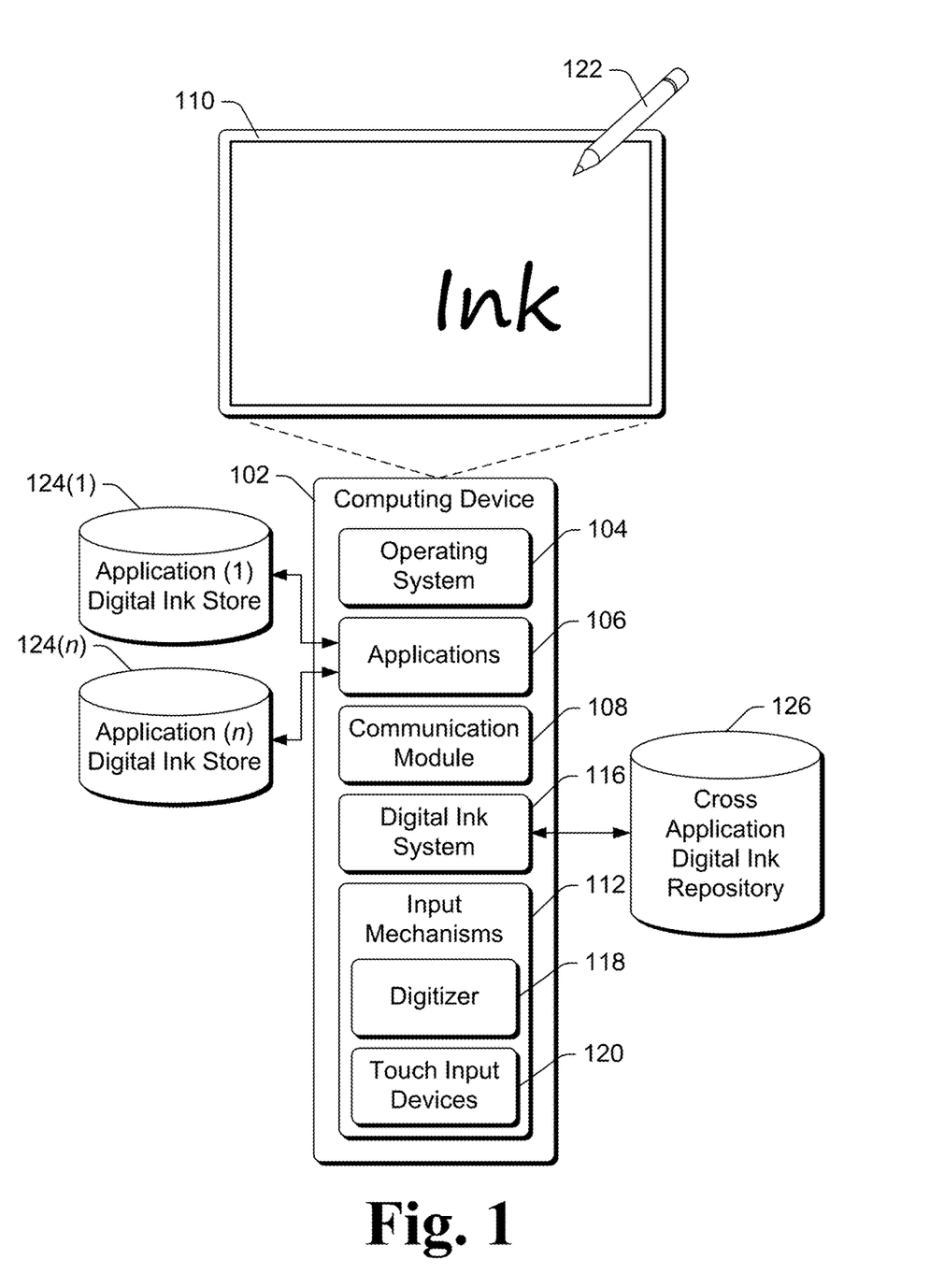
FIG. 1 illustrates an example environment in which the techniques for a cross application digital ink repository discussed herein can be used.

FIG. 1 illustrates an example environment 100 in which the techniques for a cross application digital ink repository discussed herein can be used. The environment 100 includes a computing device 102 that can be embodied as any suitable device such as, by way of example, a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), an Internet of Things (IoT) device (e.g., objects or things with software, firmware, and/or hardware to allow communication with other devices), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 includes a variety of different functionalities that enable various activities and tasks to be performed. For instance, the computing device 102 includes an operating system 104, multiple applications 106, and a communication module 108. Generally, the operating system 104 is representative of functionality for abstracting various system components of the computing device 102, such as hardware, kernel-level modules and services, and so forth. The operating system 104, for instance, can abstract various components of the computing device 102 to the applications 106 to enable interaction between the components and the applications 106.

The applications 106 represent functionalities for performing different tasks via the computing device 102. Examples of the applications 106 include a word processing application, an information gathering and/or note taking application, a spreadsheet application, a web browser, a gaming application, and so forth. The applications 106 may be installed locally on the computing device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the computing device 102 to communicate over wired and/or wireless connections. For instance, the communication module 108 represents hardware and logic for communication via a variety of different wired and/or wireless technologies and protocols.

The computing device 102 further includes a display device 110, input mechanisms 112, and a digital ink system 116. The display device 110 generally represents functionality for visual output for the computing device 102. Additionally, the display device 110 optionally represents functionality for receiving various types of input, such as touch input, pen input, and so forth. The input mechanisms 112 generally represent different functionalities for receiving input to the computing device 102. Examples of the input mechanisms 112 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 112 may be separate or integral with the display 110; integral examples include gesture-sensitive displays with integrated touch-sensitive or motion-sensitive sensors. The input mechanisms 112 optionally include a digitizer 118 and/or touch input devices 120. The digitizer 118 represents functionality for converting various types of input to the display device 110 and/or the touch input devices 120 into digital data that can be used by the computing device 102 in various ways, such as for generating digital ink. The touch input devices 120 represent functionality for providing touch input separately from the display 110.

Although reference is made herein to the display device 110 receiving various types of input such as touch input or pen input, alternatively the display device 110 may not receive such input. Rather, a separate input device (e.g., a touchpad) implemented as a touch input device 120 can receive such input. Additionally or alternatively, the display device 110 may not receive such input, but a pen (such as pen 122) can be implemented as a touch input device 120, and the pen device provides an indication of the input rather than the input being sensed by the display device 110.

According to various implementations, the digital ink system 116 represents functionality for performing various aspects of techniques for a cross application digital ink repository discussed herein. Various functionalities of the digital ink system 116 are discussed below. The digital ink system 116 optionally includes an application programming interface (API) allowing the applications 106 to interact with the functionality provided by the digital ink system 116.

The environment 100 further includes a pen 122, which is representative of an input device for providing input to the display device 110. Generally, the pen 122 is in a form factor of a traditional pen but includes functionality for interacting with the display device 110 and other functionality of the computing device 102. In at least some implementations, the pen 122 is an active pen that includes electronic components for interacting with the computing device 102. The pen 122, for instance, includes a battery that can provide power to internal components of the pen 122. Alternatively or additionally, the pen 122 may include a magnet or other functionality that supports hover detection over the display device 110. This is not intended to be limiting, however, and in at least some implementations the pen 122 may be passive, e.g., a stylus without internal electronics.

Digital ink can be input by the user using the pen 122. Additionally or alternatively, digital ink can be input by the user using other input mechanisms, such as the user's finger, a stylus, and so forth.

Digital ink is described using ink stroke data, which is various information describing the digital ink input. In one or more embodiments, the ink stroke data includes a set of coordinates and optionally pressure applied at each coordinate. The coordinates can be in various coordinate systems, such as a 2-dimensional Cartesian coordinate system, a polar coordinate system, and so forth. The pressure or force can be measured in various units, such as pascals. The coordinates and optionally pressure can be sensed by various sensors of the touch input devices 120 (e.g., sensors in the display device 110, sensors in the pen 122, and so forth).

The coordinates included in the ink stroke data are a set or series of coordinates that identify the location of the input mechanism at particular times as the digital ink is being input. These particular times can be regular or irregular intervals (e.g., every 10 milliseconds). The coordinates are detected or sensed by the digitizer 118 or a touch input device 120, such as by the display device 110, by the pen 122, and so forth. Using the example of the digital ink input of "Ink" in FIG. 1, the ink stroke data for the digital ink input is the coordinates that identify the location of the input mechanism as the letter "I" is written, as the letter "n" is written, and as the letter "k" is written.

Digital ink can be input to different ones of the applications 106. For each of multiple (n) applications, there is an associated application digital ink store 124(1), . . . , 124(n). Digital ink input to an application 106 is stored in the application digital ink store 124 associated with that application 106. Each application 106 stores ink stroke data that describes the digital ink input in its associated application digital ink store 124. The application 106 can store the ink stroke data in any format desired by the application 106, and each application 106 is typically able to access ink stroke data only in its associated application digital ink store 124 (but not other application digital ink stores 124).

The application digital ink store 124 can be situated in any of a variety of locations, such as on the computing device 102, on a service accessed via a network or other connection, on a pen providing the digital ink input (e.g., the pen 122), and so forth. When situated on a service accessed via a network or other connection, the computing device 102 can communicate with one or more computing devices implementing the service via any of a variety of different networks, including the Internet, a local area network (LAN), a public telephone network, an intranet, other public and/or proprietary networks, combinations thereof, and so forth. Additionally or alternatively, the computing device 102 can communicate with one or more computing devices implementing the service via any of a variety of other wired or wireless connections, such as a USB (universal serial bus) connection, a wireless USB connection, an infrared connection, a Bluetooth connection, a DisplayPort connection, a PCI (a peripheral component interconnect) Express connection, and so forth.

The digital ink system 116 also stores an indication of the ink stroke data for the digital ink input, as well as data representing a context of the digital ink input, in a digital ink container in a cross application digital ink repository 126. The digital ink repository 126 stores digital ink containers for multiple different applications 106, and thus is referred to as a cross application digital ink repository. Additionally, although a single computing device 102 is illustrated in FIG. 1, digital ink containers for applications on multiple different computing devices (each of which can be any of a variety of different types, analogous to the discussion of computing device 102 above) can be stored in the cross application digital ink repository 126.

The cross application digital ink repository 126 can be situated in any of a variety of locations, such as on the computing device 102, on a service accessed via a network or other connection, on a pen providing the digital ink input (e.g., the pen 122), and so forth. When situated on a service accessed via a network or other connection, the computing device 102 can communicate with one or more computing devices implementing the service via any of a variety of different networks, including the Internet, a LAN, a public telephone network, an intranet, other public and/or proprietary networks, combinations thereof, and so forth. Additionally or alternatively, the computing device 102 can communicate with one or more computing devices implementing the service via any of a variety of other wired or wireless connections, such as a USB connection, a wireless USB connection, an infrared connection, a Bluetooth connection, a DisplayPort connection, a PCI Express connection, and so forth. The cross application digital ink repository 126 and the application digital ink system 116 can be situated in the same location (e.g., on the same service), or alternatively at different locations.

Figure 2:
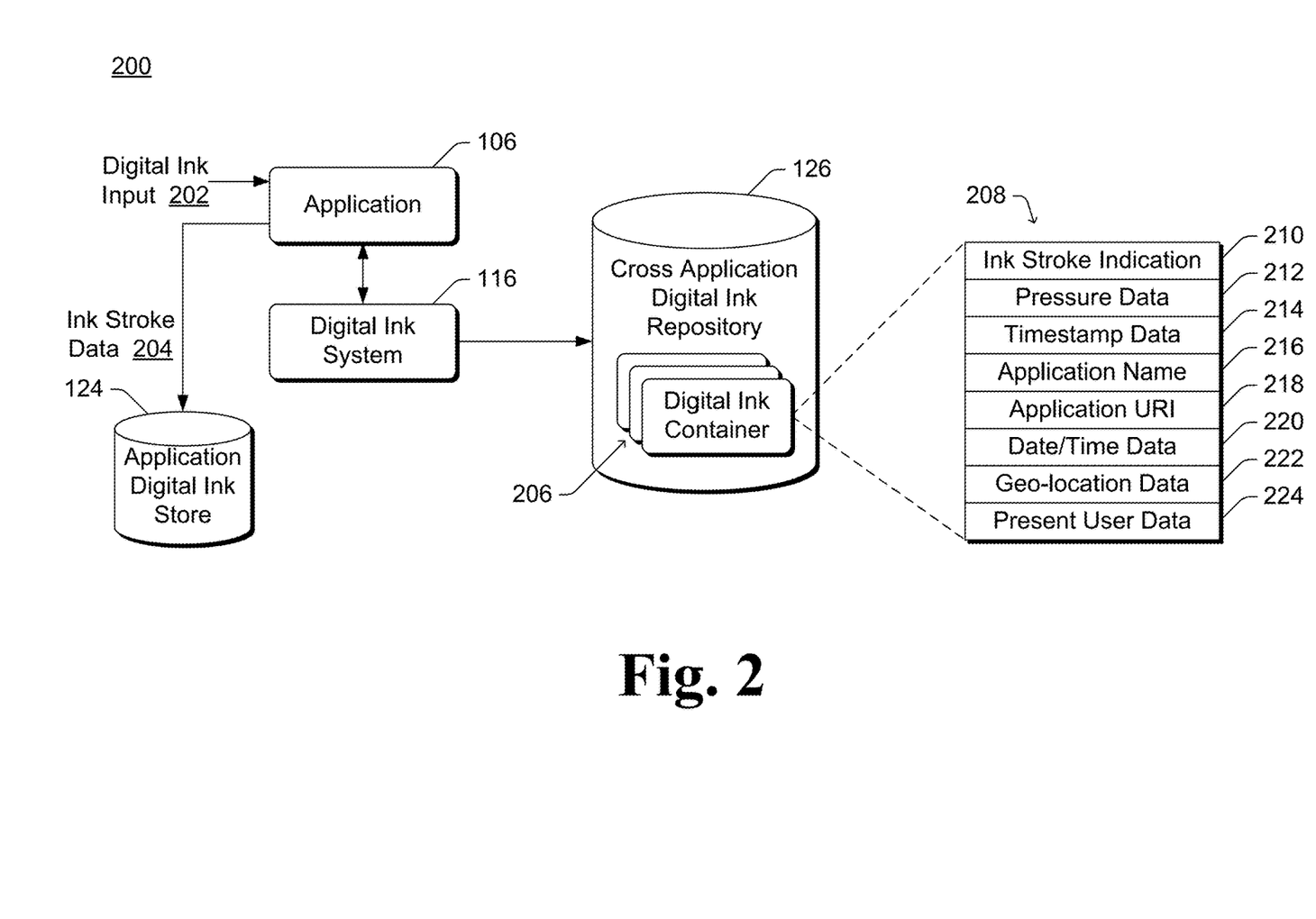
FIG. 2 illustrates an example system implementing the cross application digital ink repository in accordance with one or more embodiments.

FIG. 2 illustrates an example system 200 implementing the cross application digital ink repository in accordance with one or more embodiments. The system 200 includes an application 106 and digital ink system 116 as discussed above with reference to FIG. 1. Digital ink input 202 to the application 106 is received, and can be received in any of a variety of different manners as discussed above (e.g., a pen or finger on a touchscreen).

The digital ink system 116 provides functionality supporting the generation and storage of digital ink. This functionality is leveraged by the application 106, alleviating the application 106 of the need to implement such functionality itself. In one or more embodiments, the application 106 invokes the digital ink system 116 to receive the digital ink input 202 on behalf of the application 106. The digital ink system 116 collects ink stroke data that describes the digital ink input 202 and displays the digital ink on behalf of the application 106. The digital ink system 116 also returns the ink stroke data to the application 106, which can store the ink stroke data 204 in the application digital ink store 124 in whatever format the application desires. The application 106 can also subsequently retrieve the ink stroke data 204 from the application digital ink store 124, and provide the ink stroke data 204 to the digital ink system 116 which displays the ink stroke data 204 on behalf of the application 106.

The ink stroke data 204 refers to various information describing the digital ink input as discussed above. In one or more embodiments, the ink stroke data 204 includes the coordinates of the input device where the digital ink input 202 occurred and pressure information indicating an amount of pressure or force applied at each of those coordinates for the digital ink input 202.

The ink stroke data 204 optionally includes timestamp information, which is the date and/or time that the digital ink input 202 is received. In one or more embodiments, the timestamp information is for the digital ink input 202 as a whole (e.g., the date and/or time that the digital ink input 202 began or ended). Alternatively, separate timestamp information can be collected for each coordinate of the ink stroke data 204, the timestamp information for a coordinate comprising the date and/or time that the coordinate was touched or otherwise detected or sensed as part of the digital ink input 202.

The digital ink system 116 also generates one or more digital ink containers 206, including a digital ink container for the digital ink input 202. For example, the digital ink container 208 can be the digital ink container for the digital ink input 202, and the contents of the digital ink container 208 are illustrated in FIG. 2. The digital ink container 208 includes an ink stroke indication 210, pressure data 212, and timestamp data 214. The digital ink container 208 also includes data representing a context of the digital ink input. The context data includes an application name 216, an application uniform resource identifier (URI) 218, a date and/or time 220, geographic location data 222, and present user data 224. It should be noted that the data and information included in the digital ink container 208 is an example, and that not all of the data and information illustrated in FIG. 2 need be included. For example, the digital ink container 208 may not include the pressure data 212, the timestamp data 214, the application name 216, the date and/or time data 220, the geographic location data 222, the present user data 224, or combinations thereof.

The ink stroke indication 210 refers to an identifier or other indication of the digital ink input 202. The ink stroke indication 210 can take a variety of different forms. In one or more embodiments, the ink stroke indication 210 is the set or series of coordinates included in the ink stroke data for the digital ink input 202. Additionally or alternatively, the ink stroke indication 210 can take other forms. For example, the ink stroke indication 210 can be a screenshot or screen capture of the display device (or part of the display device, such as the window in which application 106 is displaying a user interface) when the digital ink input 202 was input. In such situations, the ink stroke indication 210 includes a still image (e.g., stored in any of a variety of different formats, such as the Joint Photographic Experts Group (JPEG) format) that includes the digital ink input 202 as well as any other data being displayed by the application 106 at the time the digital ink input 202 is received. By way of another example, the ink stroke indication 210 can be a still image (e.g., stored in any of a variety of different formats, such as the JPEG format) of just the digital ink input 202. In such situations, the ink stroke indication 210 includes the still image of the digital ink input 202 but does not include other data being displayed by the application 106 at the time the digital ink input 202 is received.

By way of another example, the ink stroke indication 210 can be an animated view of the digital ink input 202, such as a video or animation. This animated view of the digital ink input 202 shows the motion of the input device (e.g., pen, stylus, finger, etc.) while inputting the digital ink input 202. This animated view can be a video captured by the digital ink system 116 as the digital ink input 202 is received, or can be an animation generated by the digital ink system 116 (e.g., based on the coordinates of the input device where the digital ink input was received and the timing of when those coordinates were identified or sensed). The animated view can be displayed on a blank background, or alternatively on a screenshot or screen capture of the display device (or part of the display device, such as the window in which application 106 is displaying a user interface) at the time the digital ink input 202 began (or which may change while receiving the digital ink input 202).

The pressure data 212 refers to an indication of an amount of pressure applied during the digital ink input 202. This amount of pressure can be the pressure at each of the coordinates for the digital ink input, and is optionally the same pressure data as is included in the ink stroke data 204. Additionally or alternatively, this amount of pressure can take different forms, such as a value representing the pressure applied during the digital ink input 202 (e.g., an average of pressures applied during the digital ink input 202), an amount of pressure applied at a particular point during the digital ink input 202 (e.g., at the beginning of the digital ink input 202, at the end of the digital ink input 202, at a mid-point of the digital ink input 202), and so forth.

The timestamp data 214 refers to the date and/or time that the digital ink input 202 was received. The timestamp data 214 can be for the digital ink input 202 as a whole (e.g., the date and/or time that the digital ink input 202 began or ended). Alternatively, the timestamp data 214 can be a set of timestamp data with different timestamp data associated with each of the different coordinates of the digital ink input 202. The timestamp data 214 is optionally the same timestamp information as is included in the ink stroke data 204.

The application name 216 refers to a name of the application 106, typically a common name or user-friendly name that users readily identify. This allows, for example, a name of the application 106 that would be readily recognized by a user to be displayed to the user when searching for digital ink.

The application URI 218 refers to an identifier of the application 106 that allows the application 106 to be distinguished from other applications. Different URIs are used for different versions of an application for the same platform (e.g., operating system), for different versions of an application for different platforms, and so forth.

The date and/or time data 220 refers to the date and/or time at which the digital ink input 202 was input (e.g., the date and/or time that the digital ink input 202 began or ended). It should be noted that in some situations (such as situations in which the timestamp data 214 is for the digital ink input 202 as a whole) the digital ink container 208 includes the data 214 or the data 220, but need not include both.

The geographic location (geo-location) data 222 refers to the geographic location of the computing device implementing (e.g., running) the application 106 at the time the digital ink input 202 is received. The geographic location of the computing device can be determined using any of a variety of public and/or proprietary techniques. For example, the computing device can include a Global Positioning System (GPS) module that can determine the geographic location of the device. By way of another example, wireless signals (e.g., Wi-Fi network names, such as Service Set Identifier (SSID) values) that are detected by a module of the computing device can be used to determine the geographic location of the device.

The geographic location of the device can optionally be converted into a user-friendly or user-desired name. This conversion can be performed by the computing device or alternatively another service accessed by the computing device. For example, certain GPS coordinates and/or Wi-Fi network names may be associated with particular buildings (e.g., street addresses), particular rooms (e.g., a particular office or conference room in a building), particular companies or business names (e.g., which span multiple buildings), user-defined locations (e.g., "home" or "work"), and so forth.

The present user data 224 refers to identifiers of users that are present at the time when the digital ink input 202 is input. A user can be present by being physically at the same geographic location as the input mechanism providing the digital ink input 202, or alternatively by being in communication with (e.g., in a video conference or teleconference with) the user providing the digital ink input 202. These users are, for example, users other than the user providing the digital ink input 202. Users that are present at the time when the digital ink input 202 is input can be identified in a variety of different manners. In one or more embodiments, if the digital ink input 202 is input during a meeting that has been scheduled on the inputting user's calendars, other users that are part of the meeting (e.g., that were invited to the meeting, that accepted the meeting invitation, that logged into the meeting (e.g., by teleconference or videoconference), etc.) are determined to be present at the time when the digital ink input 202 is input.

Additionally or alternatively, other techniques can be used to determine which users are present at the time when the digital ink input 202 is input. For example, multiple users may be concurrently logged into or identified by the computing device implementing the application 106, and those multiple users can be determined to be present at the time when the digital ink input 202 is input. By way of another example, during a meeting multiple users may be associated with an input mechanism (e.g., a pen) and are able to provide digital ink input to the application 106, and each of those multiple users can be determined to be present at the time when the digital ink input 202 is input.

The digital ink system 116 provides ink stroke data for the digital ink input 202 to the application 106. The ink stroke data refers to the data for each stroke of the digital ink input 202. An ink stroke refers to at least a portion of the digital ink input 202. For example, the ink stroke can be from the time the input device first makes contact with a touchscreen (e.g., the pen is sensed by the touchscreen) to the time the input device breaks contact with the touchscreen (e.g., the pen is no longer sensed by the touchscreen). E.g., if the user were to input the letter "T", the input would typically be two ink strokes—one stroke being the horizontal part of the "T" and the other stroke being the vertical part of the "T". However, if the user were to input the letter "O", the input would typically be a single stroke. The data for these ink strokes is provided to the application 106, which can collect and store the ink stroke data in the application digital ink store 124 in any manner the application 106 desires (e.g., as individual ink strokes, as collections of ink strokes, and so forth).

The digital ink system 116 determines how much of the digital ink input 202 (e.g., data for how many strokes) to include in a digital ink container. The digital ink system 116 can use any of a variety of different criteria to determine how much of the digital ink input 202 to include in a digital ink container. In one or more embodiments, the digital ink system 116 defines a "session", and the part of the digital ink input 202 input during a session is included in a single digital ink container. The session can be defined in different manners. In one or more embodiments, a session is all of the digital ink input 202 from the first input stroke until the current application of the computing device switches from the application 106 to a different application (e.g., the user changes which application he or she is currently using). Additionally or alternatively, a session can be defined in other manners. For example, a session can be all of the digital ink input 202 from the first input stroke until a particular user selection is made (e.g., user selection of a "save" button or option). By way of another example, a session can be all of the digital ink input 202 from the first input stroke until a particular amount of time elapses (e.g., 10 or 15 minutes), from the first input stroke until a threshold amount of time elapses (e.g., 3 or 5 minutes) without any additional input strokes, and so forth.

The digital ink system 116 can store digital ink containers 206 in the cross application digital ink repository 126 in an encrypted or unencrypted format. In one or more embodiments, the cross application digital ink repository 126 is stored in a location (e.g., a shared network drive or service) that is accessible to a user only after he or she uses his or her credentials (e.g., smartcard, user name and password, etc.) to log into a computing device that accesses the digital ink repository 126. In such situations, the digital ink containers 206 need not be encrypted (but could be encrypted) because the digital ink containers 206 are only accessible to users that have provided their credentials. In other embodiments, the cross application digital ink repository 126 is stored in a different location (e.g., memory devices included in a pen used to provide the digital ink input 202) that may be accessible to multiple users (e.g., any user that picks up the pen). In such situations, the digital ink containers 206 are optionally encrypted so that they are only accessible to users that are able to provide correct user credentials (e.g., smartcard, user name and password, etc.) to decrypt the digital ink containers 206. In response to the user providing the correct user credentials, the digital ink containers are decrypted (e.g., using a key associated with the user credentials).

Figure 3:
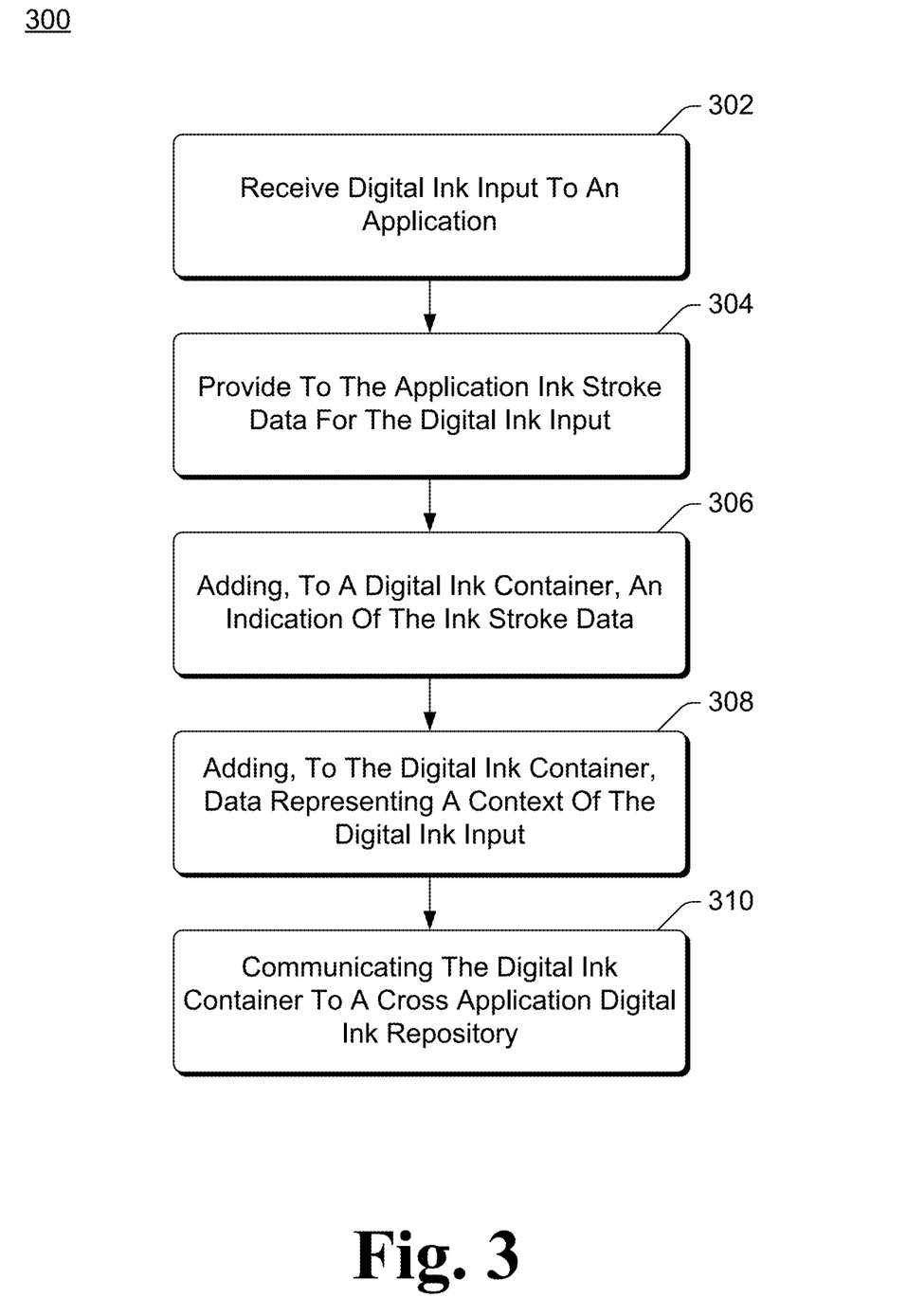
FIG. 3 is a flowchart illustrating an example process for implementing the cross application digital ink repository in accordance with one or more embodiments.

FIG. 3 is a flowchart illustrating an example process 300 for implementing the cross application digital ink repository in accordance with one or more embodiments. Process 300 is carried out by a computing device, such as the computing device 102 of FIG. 1, and can be implemented in software, firmware, hardware, or combinations thereof. Process 300 is shown as a set of acts and is not limited to the order shown for performing the operations of the various acts. Process 300 is an example process for implementing the cross application digital ink repository; additional discussions of implementing the cross application digital ink repository are included herein with reference to different figures.

In process 300, a digital ink input to an application is received (act 302). The digital ink input can be input directly to the application and provided to a digital ink system, or can be provided to a digital ink system that receives the digital ink input on behalf of the application.

Ink stroke data for the digital ink input is provided to the application (act 304). The ink stroke data refers to various information describing the digital ink input, such as a set or series of coordinates and pressure information indicating as discussed above.

An indication of the ink stroke data is added to a digital ink container (act 306). The indication of the ink stroke data can take various forms as discussed above, such as the set or series of coordinates describing the digital ink input, a screenshot or screen capture of the display device (or part of the display device, such as the window in which application 106 is displaying a user interface) when the digital ink input was input, a still image of just the digital ink input, an animated view of the digital ink input, and so forth.

Data representing a context of the digital ink input is also added to the digital ink container (act 308). The context data for the digital ink input can be, for example, a name of the application to which the digital ink input was input, a URI of the application to which the digital ink input was input, the date and/or time at which the digital ink input was input, the geographic location of the computing device implementing process 300 at the time the digital ink input was input, users that are present (e.g., physically, by video conference, by teleconference, etc.) at the time when the digital ink input was input, and so forth.

The digital ink container is communicated to a cross application digital ink repository (act 310). The cross application digital ink repository can be maintained at various locations as discussed above, and includes at least part of the digital ink input (the part of the digital ink input that was received during a session as discussed above). In one or more embodiments, the indication of the ink stroke data and the context of the digital ink input are received and maintained at the computing device implementing process 300 until the session ends, and in response to the session ending the digital ink container is communicated to the cross application digital ink repository. Alternatively, a digital ink container can be created and opened on the cross application digital ink repository, and the indication of the ink stroke data and the context of the digital ink input are received at the computing device implementing process 300 and communicated to the cross application digital ink repository during the session, and in response to the session ending the digital ink container is closed.

Returning to FIG. 1, the digital ink containers stored in the cross application digital ink repository 126 can be searched using various search criteria. The searching is performed by a search program, which can be various programs such as one of the applications 106, part of the operating system 104, part of the digital ink system 116, and so forth. The digital ink repository 126 stores digital ink containers for multiple applications 106, and thus the searching for digital ink can be performed across the multiple applications 106. The searching can be performed by a search program that supports digital ink inputs, or alternatively a search program that does not support digital ink inputs. For example, the search program may be a browser or explorer program that itself does not support the input of digital ink to the search program, but can still be used to search for digital ink on the digital ink repository 126.

Search criteria are provided by the user to the search program. The search criteria can be any criteria related to the context of digital ink inputs. For example, the criteria can be based on an application name, date and/or time of the digital ink input, geographic location of the digital ink input, users present when the digital ink input was received, and so forth. Various different matching techniques can be used, such as time and/or date ranges, wild card characters (e.g., a question mark used to represent any single character or an asterisk to represent any number of characters), and so forth.

The searching of the cross application digital ink repository 126 allows the user to search for digital ink without requiring the user to remember which application he or she used to input the digital ink. For example, a user may have an information gathering application to which he inputs digital ink, a word processing application to which he inputs digital ink, a note taking application to which he inputs digital ink, and so forth. The user may remember that he input a list of items two weeks ago using digital ink, but may not remember which application he used to input that list. Rather than going through his applications individually and trying to find the list, the user can search the cross application digital ink repository 126 for digital ink inputs that were received approximately two weeks ago (e.g., between 10 and 18 days ago). If the user remembers other details, such as that he was at home when he entered the list, then he can further add search criteria that the geographic location is home. The search program then uses this search criteria (e.g., digital ink inputs that were received approximately two weeks ago at the geographic location of home) to identify digital ink containers that satisfy the search criteria. The indications of the digital ink that are included in those identified digital ink containers can be displayed to the user, giving the user at least an indication of what the digital ink for each digital ink container is.

The search program displays an indication of zero or more digital ink containers that satisfy the search criteria. The user can select one of these displayed digital ink containers and have the application that was used to input the digital ink associated with the selected digital ink container opened and the digital ink displayed. In response to user selection of a digital ink container, the search program notifies the operating system 104 to run the application identified by the URI data in the selected digital ink container. The operating system 104 runs the application identified by the URI data, which optionally displays the digital ink for the selected digital ink container. This display can be, for example, opening and displaying of a file from the corresponding application digital ink store 124 that includes the digital ink, displaying of a database entry from the corresponding application digital ink store 124 that includes the digital ink, and so forth. The file, database entry, etc. that is to be opened can be determined in a variety of different manners. For example, the application can have provided an identifier of the file, database entry, etc. to the digital ink system 116, and the digital ink system 116 can include the provided identifier in the digital ink container created by the digital ink system 116. This identifier can then be passed to the application from the search program when the digital ink container is selected.

Situations can arise in which the application identified by the URI data in the selected digital ink container is not installed on the computing device 102. Such situations can arise, for example, when the digital ink associated with the digital ink container is input to an application on one computing device, but the digital ink repository 126 is searched using a search program on a different computing device. In such situations, the URI data allows the application to be identified and obtained (e.g., downloaded from an online store) by the computing device 102. The application can be downloaded, installed, and run on the computing device 102, or alternatively run elsewhere (e.g., as an online application via a service).

It should be noted that the URI data also allows the digital ink to be used across different platforms (e.g., operating systems). For example, the digital ink may be input to an application running on one type of operating system, but searched using a search program on a different type of operating system. A service (e.g., an online store, a local service on the computing device, etc.) can maintain a record of which URIs correspond to the same applications on different platforms, and this service can be accessed to determine which application the URI data represents on the computing device running the search program.

Figure 4:
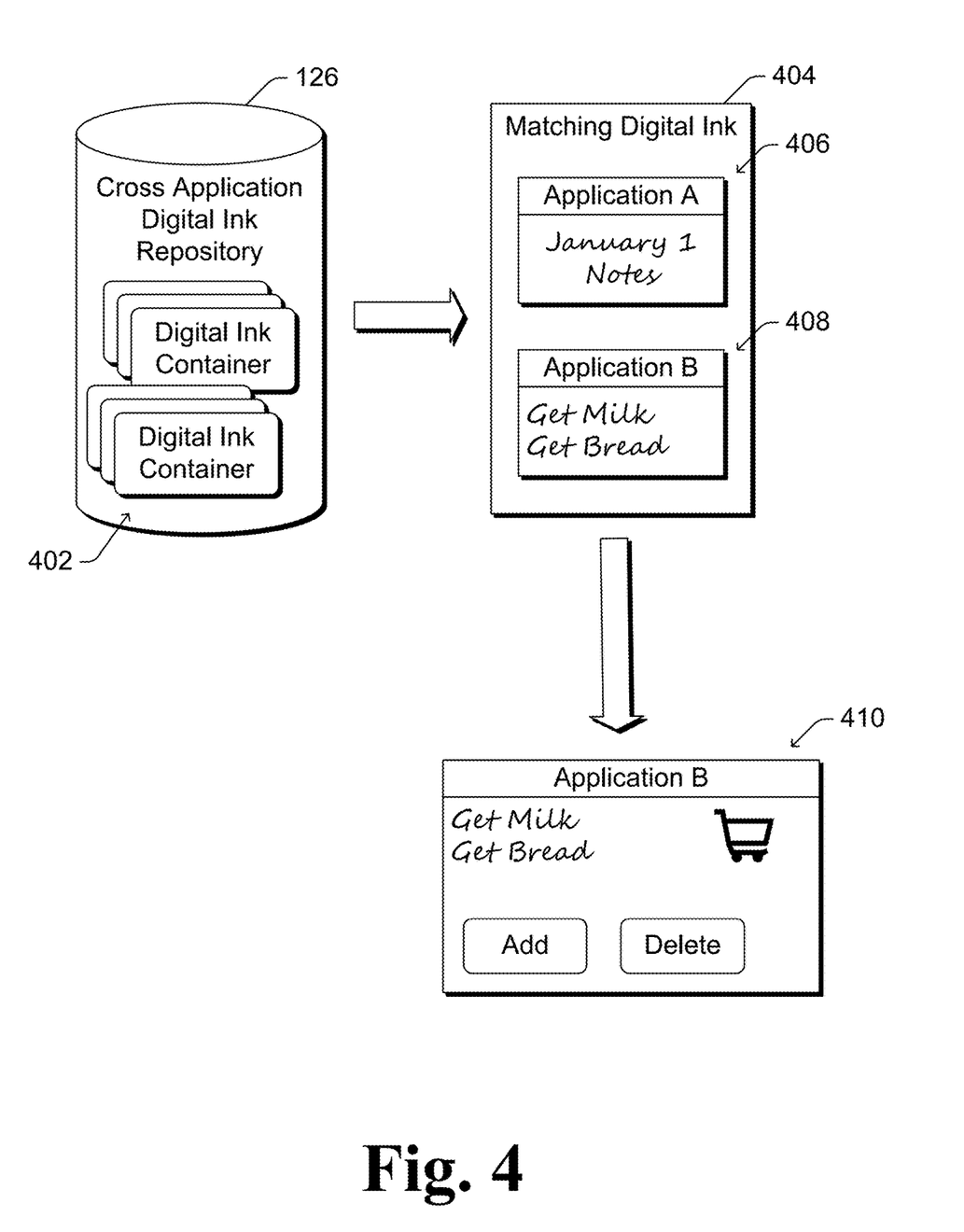
FIG. 4 illustrates an example of searching a cross application digital ink repository.

FIG. 4 illustrates an example 400 of searching a cross application digital ink repository. In the example 400, the cross application digital ink repository 126 stores multiple digital ink containers 402 associated with digital ink input to multiple different applications running on one or more computing devices. User search criteria are provided by a user to a search program, and the search program searches the digital ink repository 126 to identify one or more digital ink containers 402 that satisfy the search criteria. In the illustrated example 400, the search program generates a display 404 in which the indicated digital ink strokes from two digital ink containers 402 that satisfy the search criteria are displayed. The display 404 includes a first digital ink container 406 in which the indicated digital ink strokes for one of the two digital ink containers 402 that satisfy the search criteria are displayed, along with an indication of the name of the program to which the digital ink strokes were input (shown as "Application A"). The display 404 includes a second digital ink container 408 in which the indicated digital ink strokes for the other of the two digital ink containers 402 that satisfy the search criteria are displayed, along with an indication of the name of the program to which the digital ink strokes were input (shown as "Application B"). The user selects the digital ink container 408, which causes Application B to be run and the digital ink associated with digital ink container 408 to be displayed in display 410.

Figure 5:
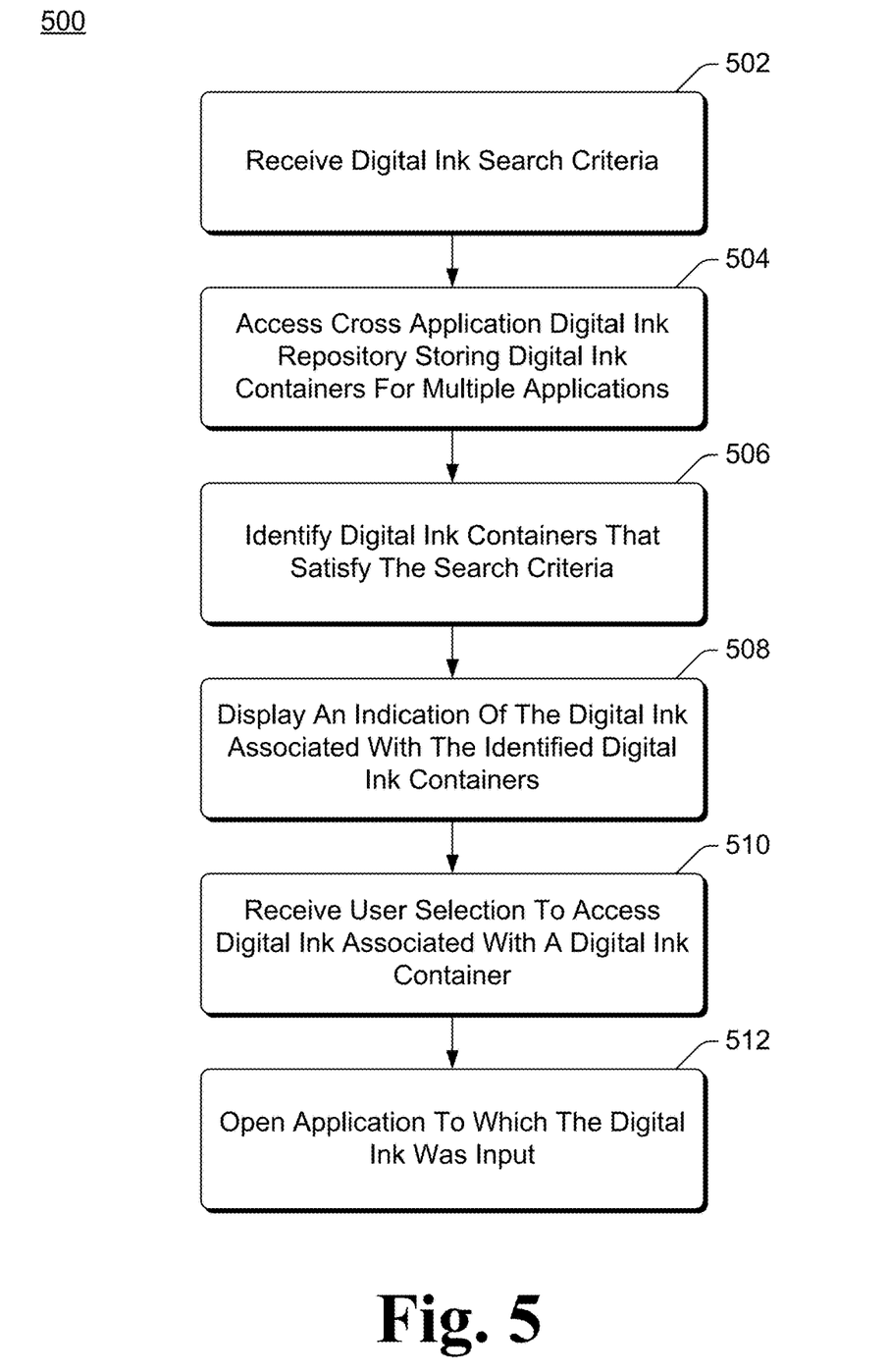
FIG. 5 is a flowchart illustrating an example process for searching a cross application digital ink repository in accordance with one or more embodiments.

FIG. 5 is a flowchart illustrating an example process 500 for searching a cross application digital ink repository in accordance with one or more embodiments. Process 500 is carried out by a computing device, such as the computing device 102 of FIG. 1, and can be implemented in software, firmware, hardware, or combinations thereof. Process 500 is shown as a set of acts and is not limited to the order shown for performing the operations of the various acts. Process 500 is an example process for searching a cross application digital ink repository; additional discussions of searching a cross application digital ink repository are included herein with reference to different figures.

In process 500, digital ink search criteria are received (act 502). The digital ink search criteria are received by a search program as discussed above.

The cross application digital ink repository is accessed (act 504). The cross application digital ink repository stores digital ink containers for multiple applications, and one or more digital ink containers that satisfy the search criteria are identified (act 506).

An indication of the digital ink associated with the one or more digital ink containers that satisfy the search criteria is displayed (act 508). These indications are the ink stroke indications included in the digital ink containers as discussed above.

A user selection to access the digital ink associated with a digital ink container is received (act 510). The user selection can be received in various manners, such as clicking on, touching, and so forth one of the displayed digital ink containers.

An application to which the digital ink was input is opened in response to the user selection of the digital ink container associated with the digital ink (act 512). The digital ink is also optionally displayed by the application. The application is also optionally installed on the computing device implementing process 500 if not previously installed, as discussed above.

Returning to FIG. 1, in the discussions herein the digital ink system 116 is described as providing functionality allowing the applications 106 to receive digital ink inputs from a user of the computing device 102, store received digital ink inputs, and display digital ink inputs, and thus of alleviating the applications 106 from the burden of implementing their own digital ink functionality. Alternatively, the functionality of the digital ink system 116 discussed herein can be implemented in the applications 106. In such situations, the applications 106 can stored ink stroke data in the application digital ink stores 124 as discussed above, but adhere to a common or known format for generating the digital ink containers that are stored in the cross application digital ink repository 126. By adhering to a common or known format, the digital ink containers from multiple applications can be searched as discussed above.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
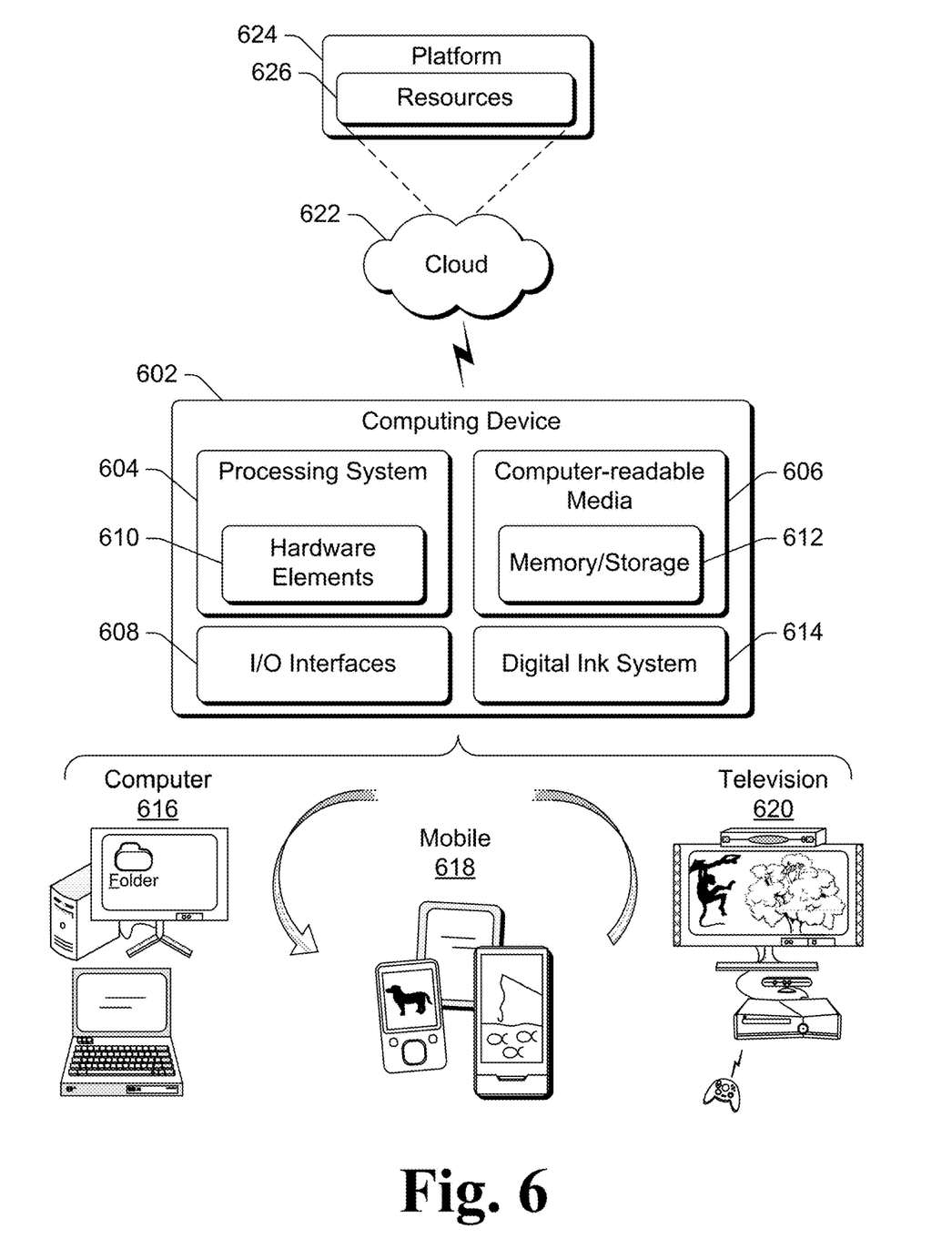
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a digital ink system 614. The digital ink system 614 provides various functionality supporting digital ink and a cross application digital ink repository as discussed above. The digital ink system 614 can be, for example, the digital ink system 116 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: receiving a digital ink input to an application; providing to the application ink stroke data for the digital ink input; adding, to a digital ink container, an indication of the ink stroke data for the digital ink input; adding, to the digital ink container, data representing a context of the digital ink input, the data representing the context of the digital ink input including an identifier of the application; and communicating the digital ink container to a cross application digital ink repository, the cross application digital ink repository storing the digital ink container as well as multiple additional digital ink containers each including ink stroke data indications for additional digital ink inputs to each of one or more additional applications.

Alternatively or in addition to any of the above described methods, any one or combination of: the method being implemented in a digital ink system of a computing device running the application and at least one of the additional applications; the data representing the context of the digital ink input further including a uniform resource identifier that distinguishes the application from other applications, a date and/or time at which the digital ink was input to the application, and a geographic location of a device implementing the application at the time the digital ink was input to the application; the data representing the context of the digital ink input further including an identifier of users that are present when the digital ink was input to the application; a user being present when the digital ink was input to the application by being at the geographic location, or by being in a video conference or teleconference call with the user that input the digital ink to the application; the indication of the ink stroke data comprising coordinates of the input device where the digital ink input occurred; the indication of the ink stroke data comprising a screenshot of at least part of a display device when the digital ink was input; the indication of the ink stroke data comprising an animated view of the digital ink input; the method further comprising receiving digital ink search criteria, identifying digital ink containers in the cross application digital ink repository that satisfy the digital ink search criteria, and displaying indications of the digital ink associated with the identified digital ink containers; the method being implemented on a computing device, the method further comprising receiving a user selection of one of the identified digital ink containers, and running, on the computing device, the application to which the digital ink associated with the user-selected digital ink container was input; the method further comprising identifying, based on a uniform resource identifier included in the user-selected digital ink container, the application, downloading the application from an online store, and installing the downloaded application on the computing device prior to running the application on the computing device.

A system comprising: one or more storage devices configured to store instructions for an application and a digital ink store associated with the application; one or more processors configured to run the application; a digital ink system configured to receive a digital ink input to the application, to provide to the application ink stroke data for the digital ink input, to add to a digital ink container an indication of the ink stroke data for the digital ink input, and to add to the digital ink container context data representing a context of the digital ink input, the context data including an identifier of the application; and a communication module configured to communicate the digital ink container to a cross application digital ink repository, the cross application digital ink repository storing the digital ink container as well as multiple additional digital ink containers each including ink stroke data indications for additional digital ink inputs to each of one or more additional applications.

Alternatively or in addition to any of the above described systems, any one or combination of: the one or more processors being further configured to run a search program configured to receive digital ink search criteria, identify digital ink containers in the cross application digital ink repository that satisfy the digital ink search criteria, display indications of the digital ink associated with the identified digital ink containers, receive a user selection of one of the identified digital ink containers, and run, on the system, the application to which the digital ink associated with the user-selected digital ink container was input; the indication of the ink stroke data comprising an animated view of the digital ink input.

A computing device comprising: one or more processors; and a computer-readable storage medium having stored thereon multiple instructions that, responsive to execution by the one or more processors, cause the one or more processors to perform acts comprising: receiving a digital ink input to an application executed by the one or more processors; providing to the application ink stroke data for the digital ink input; adding, to a digital ink container, an indication of the ink stroke data for the digital ink input; adding, to the digital ink container, context data representing a context of the digital ink input, the context data including a uniform resource identifier of the application that distinguishes the application from other applications; and communicating the digital ink container to a cross application digital ink repository, the cross application digital ink repository storing the digital ink container as well as multiple additional digital ink containers each including ink stroke data indications for additional digital ink inputs to each of the other applications.

Alternatively or in addition to any of the above described computing devices, any one or combination of: the acts further comprising receiving digital ink search criteria, identifying digital ink containers in the cross application digital ink repository that satisfy the digital ink search criteria, displaying indications of the digital ink associated with the identified digital ink containers; receiving a user selection of one of the identified digital ink containers, running, on the computing device, the application to which the digital ink associated with the user-selected digital ink container was input; the context data further including a date and/or time at which the digital ink was input to the application, and a geographic location of a device implementing the application at the time the digital ink was input to the application; the context data further including an identifier of users that are present when the digital ink was input to the application; the indication of the ink stroke data comprising a screenshot of at least part of a display device when the digital ink was input; the digital ink input having been provided by movement of a pen, and the cross application digital ink repository comprising a storage device implemented in the pen.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a digital ink input to an application;
   providing to the application ink stroke data for the digital ink input;
   determining a portion of the digital ink input to include in a digital ink container responsive to determining that a digital ink session has ended;
   adding, to the digital ink container, an indication of the ink stroke data for the portion of the digital ink input and context data representing a context of the portion of the digital ink input, the context data including an identifier of the application that distinguishes the application from other applications;
   communicating the digital ink container to a cross application digital ink repository, the cross application digital ink repository storing the digital ink container as well as multiple additional digital ink containers each including ink stroke data indications for additional portions of digital ink input for each of one or more additional applications;
   receiving a selection of the digital ink container from among a plurality of digital ink containers stored in the cross application digital ink repository; and
   in response to the selection, running the application identified by the identifier in the digital ink container to display the digital ink associated with the digital ink container.

2. The method of claim 1, the method being implemented in a computing device running the application and at least one of the additional applications.

3. The method of claim 1, wherein the identifier comprises a uniform resource identifier that distinguishes the application from other applications; and
   wherein the context data further includes:
      a date and/or time at which the portion of the digital ink input was input to the application; and
      a geographic location of a device implementing the application at the time the portion of the digital ink input was input to the application.

4. The method of claim 3, wherein the context data further includes an identifier of users that are present when the portion of the digital ink input was input to the application.

5. The method of claim 4, a user being present when the portion of the digital ink input was input to the application by being at the geographic location, or by being in a video conference or teleconference call with the user that input the portion of the digital ink input to the application.

6. The method of claim 1, the indication of the ink stroke data comprising coordinates of the input device where the portion of the digital ink input occurred.

7. The method of claim 1, the indication of the ink stroke data comprising a screenshot of at least part of a display device when the portion of the digital ink was input.

8. The method of claim 1, the indication of the ink stroke data comprising an animated view of the portion of the digital ink input.

9. The method of claim 1, further comprising:
receiving digital ink search criteria;
identifying digital ink containers in the cross application digital ink repository that satisfy the digital ink search criteria; and
displaying indications of the portions of digital ink input associated with the identified digital ink containers.

10. The method of claim 9, wherein the receiving the selection of the digital ink container from among the plurality of digital ink containers stored in the cross application digital ink repository comprises receiving a user selection of one of the identified digital ink containers; and
wherein the running the application identified by the identifier in the digital ink container to display the digital ink associated with the digital ink container comprises running, on the computing device, the application to which the portion of the digital ink input associated with the user-selected digital ink container was input.

11. The method of claim 10, further comprising:
identifying, based on a uniform resource identifier included in the user-selected digital ink container, the application;
downloading the application from an online store; and
installing the downloaded application on the computing device prior to running the application on the computing device.

12. A system comprising:
one or more storage devices configured to store instructions for an application and a digital ink store associated with the application;
one or more processors configured to run the application;
a digital ink system configured to receive a digital ink input to the application, to provide to the application ink stroke data for the digital ink input, to determine a portion of the digital ink input to include in a digital ink container responsive to determining that a digital ink session has ended, to add to the digital ink container an indication of the ink stroke data for the portion of the digital ink input and context data representing a context of the portion of the digital ink input, the context data including an identifier of the application that distinguishes the application from other applications;
a communication module configured to communicate the digital ink container to a cross application digital ink repository, the cross application digital ink repository storing the digital ink container as well as multiple additional digital ink containers each including ink stroke data indications for additional portions of digital ink input for each of one or more additional applications; and
an operating system configured to, in response to a selection received in the digital ink system of the digital ink container from among a plurality of digital ink containers stored in the cross application digital ink repository, run the application identified by the identifier in the digital ink container to display the digital ink associated with the digital ink container.

13. The system of claim 12, the one or more processors being further configured to run a search program configured to:
receive digital ink search criteria;
identify digital ink containers in the cross application digital ink repository that satisfy the digital ink search criteria;
display indications of the portions of digital ink input associated with the identified digital ink containers; and
receive the selection of the digital ink container from among the identified digital ink containers.

14. The system of claim 12, the indication of the ink stroke data comprising an animated view of the digital ink input.

15. A computing device comprising:
one or more processors; and
a computer-readable storage medium having stored thereon multiple instructions that, responsive to execution by the one or more processors, cause the one or more processors to perform acts comprising:
receiving a digital ink input to an application executed by the one or more processors;
providing to the application ink stroke data for the digital ink input;
determining a portion of the digital ink input to include in a digital ink container responsive to determining that a digital ink session has ended;
adding, to the digital ink container, an indication of the ink stroke data for the portion of the digital ink input and context data representing a context of the portion of the digital ink input, the context data including a uniform resource identifier of the application that distinguishes the application from other applications;
communicating the digital ink container to a cross application digital ink repository, the cross application digital ink repository storing the digital ink container as well as multiple additional digital ink containers each including ink stroke data indications for additional portions of digital ink input for each of the other applications;
receiving a selection of the digital ink container from among a plurality of digital ink containers stored in the cross application digital ink repository; and
in response to the selection, running the application identified by the identifier in the digital ink container to display the digital ink associated with the digital ink container.

16. The computing device of claim 15, the acts further comprising:
receiving digital ink search criteria;
identifying digital ink containers in the cross application digital ink repository that satisfy the digital ink search criteria;
displaying indications of the portions of digital ink input associated with the identified digital ink containers; and
receiving the selection of the digital ink container from among the identified digital ink containers.

17. The computing device of claim 15, the context data further including:
a date and/or time at which the portion of the digital ink input was input to the application; and
a geographic location of a device implementing the application at the time the portion of the digital ink input was input to the application.

18. The computing device of claim 15, the context data further including an identifier of users that are present when the portion of the digital ink input was input to the application.

19. The computing device of claim 15, the indication of the ink stroke data comprising a screenshot of at least part of a display device when the portion of the digital ink input was input.

20. The computing device of claim 15, the portion of the digital ink input having been provided by movement of a pen, and the cross application digital ink repository comprising a storage device implemented in the pen.

* * * * *